United States Patent Office 2,994,177
Patented Aug. 1, 1961

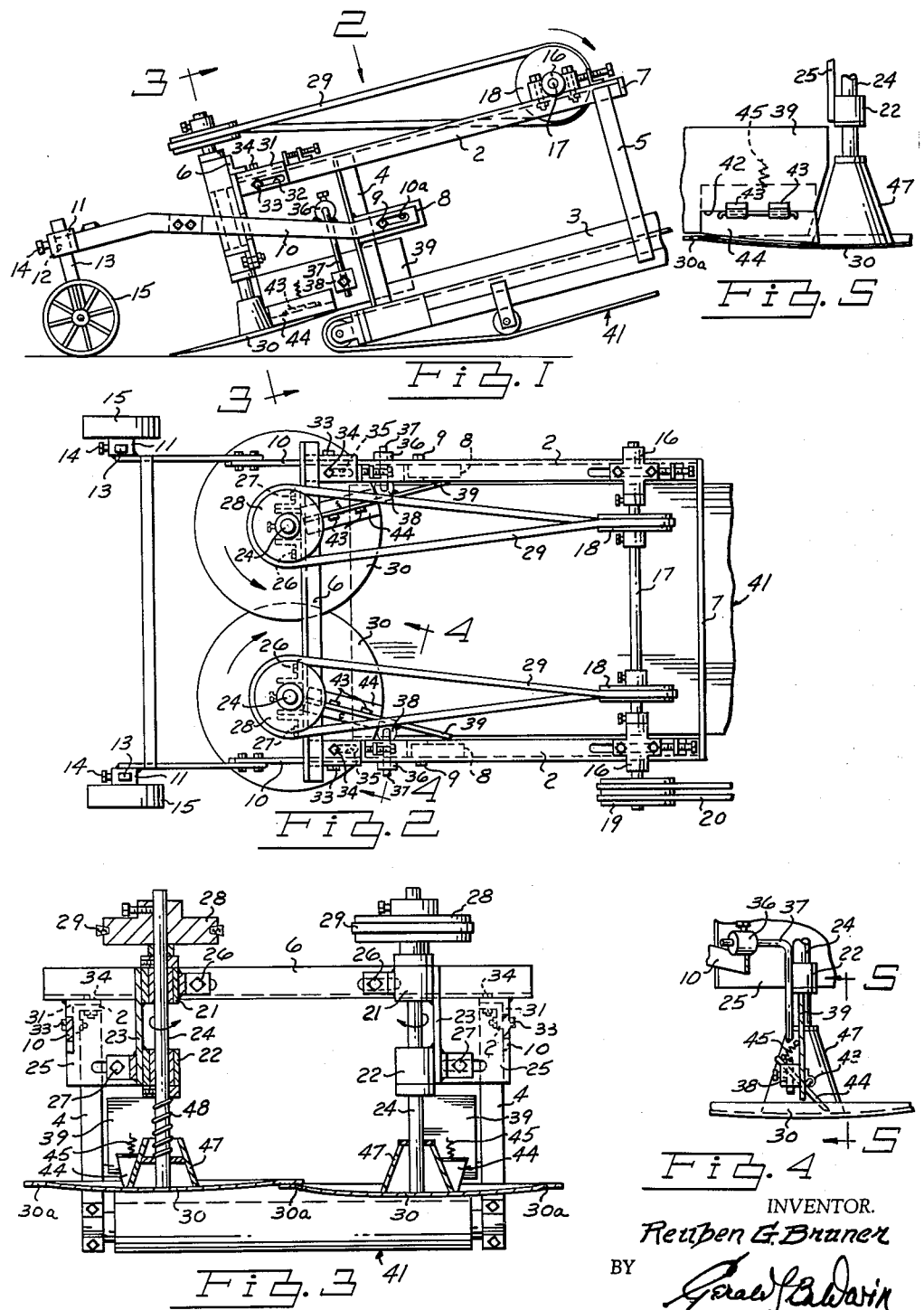

2,994,177
PICK-UPS FOR HARVESTERS
Reuben G. Bruner, 1525 W. Nine Mile Road,
Ferndale, Mich.
Filed Feb. 11, 1959, Ser. No. 792,561
1 Claim. (Cl. 56—327)

This invention relates to improvements in pick-ups for harvesters, and refers particularly to harvesters for harvesting, onions, carrots, potatoes and the like.

In my United States Patent No. 2,606,416, I described a pick-up for use on harvesters, however in that case the discs, which were rotatably mounted for delivering vegetables onto an upwardly and rearwardly inclined conveyor, were fixedly spaced transversely of the frame of the machine, and means were provided for guiding produce from the discs onto the conveyor.

It has since become increasingly more desirable to make the lateral spacing between the discs adjustable so that vegetables lying in rows will be efficiently picked up irrespective of the exact lateral distance of the rows from one another. Moreover, since the discs are dished slightly it is also necessary to provide means for plowing produce from them onto the conveyor without fear of damaging it by pinching it between the discs and the aforementioned guide means.

It is, therefore, an object of the invention to provide a pick-up for harvesters wherein the discs are laterally adjustable relative to one another.

Another object of the invention is to provide a pick-up for harvesters wherein the discs are laterally adjustable, and shields are adjustably mounted on the frame so that irrespective of the spacing of the discs the shields can be set to extend rearwardly and outwardly from behind the disc axes to the adjacent sides of the frame to guide produce onto the conveyor.

A further object of the invention is to provide such a pick-up wherein scrapers are mounted on the shields and resilient means are provided for retaining the scrapers in contact with the somewhat dished upper faces of the discs to plow vegetables rearwardly from the latter onto the conveyor.

With these and other objects and advantages in view which will become apparent as the specification proceeds the invention is hereinafter more fully described with the aid of the accompanying drawing, in which:

FIGURE 1 is a side elevation of the front portion of a harvester showing the pick-up, and FIGURE 2 is a plan view thereof as indicated by the arrow 2 in FIGURE 1.

FIGURE 3 is an enlarged section on the line 3—3 of FIGURE 1, wherein the discs are slightly modified.

FIGURE 4 is an enlarged section on the line 4—4 of FIGURE 2, and

FIGURE 5 is a section on the line 5—5 of FIGURE 4 wherein the disc is again slightly modified.

Referring to the drawing, 1 designates the front portion of the frame of a harvester which includes upper and lower side members 2 and 3 each vertically spaced pair of which are connected to one another as by substantially vertical front and rear elements 4 and 5. The frame is also transversely braced as by front and rear cross members 6 and 7. Secured to each element 4 and projecting rearwardly therefrom is a bracket 8. Extending through each bracket is a bolt 9 which also projects through a slot 10a formed through an arm 10 having a block 11 secured upon its front extremity. Mounted for substantially vertical movement through an aperture 12 formed through each block 11 is a rod 13 which is normally held immovable therein as by a screw 14. Suitably supported for rotation on the lower extremity of each block 11 is a gauge wheel 15.

Suitably secured to the upper side members 2 adjacent their rear extremities are transversely aligned bearings 16 which support a shaft 17 for rotation, and mounted on the shaft for rotation therewith between the side members are pulleys 18. Secured on one extremity of the shaft outwardly of the frame is another pair of pulleys 19 which are suitably driven as by belts 20 which extend around driving pulleys—not shown.

Secured by screws 26 for transverse adjustment across the front cross member 6 are upper bearings 21, and dependingly secured to the said cross member are plates 25 on each of which a lower bearing 22 is mounted for transverse adjustment by screws 27. Each pair of bearings 21 and 22, which support a shaft 24 for rotation, is held in axial alignment by a tie bar 23, and the axes of the shafts which are substantially vertical are usually somewhat downwardly and rearwardly inclined.

Secured upon the upper extremity of each shaft 24 is a pulley 28 around which a belt 29 passes which also extends around and is driven by one of the pulleys 18. Moreover the belts 29 are given quarter turns in opposite directions so that discs 30 secured upon the lower extremities of the shafts 24 rotate in opposite directions inwardly at the front towards one another, as indicated by the arrows A. Moreover it will be noted that the upper faces of the discs are preferably slightly dished.

Welded or otherwise suitably secured to the cross member 6 and to the plates 25 are angle members 31 having longitudinal slots 32 therethrough through which bolts 33 extend. These bolts also pass horizontally through the side members 2. Again, other bolts 34 extend substantially vertically through the angle members 31 and through longitudinal slots 35 through the said members 2. These slots and bolts permit adjustment of the longitudinal distance between the axis of the shaft 17 and the axes of the shafts 24 to compensate for stretch of the belts 29. It will also be noted that the arms 10 are fixedly secured to the plates 25 as by welding, so that when the longitudinal distance between the axes 17 and 24 is to be adjusted the bolts 9 must be loosened to permit movement of the arms along the brackets 8.

Integral with each arm 10 is a horizontal bearing 36 through which one extremity of an L-shaped rod 37 is axially slidable, and mounted for adjustment along the opposite extremity of the rod, which is vertical, is a second bearing 38 secured to a shield 39. The latter is then adjustable so that at all spacings of the shafts 24 from one another these shields are each positioned to extend from adjacent and behind the axis of one of the shafts and terminate contiguous to the adjacent side wall of a conveyor 41.

Formed in the undersides of the forward extremities of the shields 39 are open-ended slots 42, and secured upon the inner faces of the shields just above the slots are hinges 43 which are also fastened to scrapers 44 to permit the latter to turn about a horizontal axes. The upper extremities of the scrapers project outwardly relative to the shields and their lower extremities project inwardly. Secured at one extremity to each shield 39 and at its opposite extremity to the upper portion of the scraper 44 pivotally mounted thereon is a helical spring 45 which tends to pull the underside of the scraper into engagement with the disc 30 beneath it. The undersides of the scrapers are shaped to conform substantially to the curvature of the upper faces of the discs so that they bear against the latter and prevent stones and other foreign matter from becoming trapped between the scrapers and the discs and damaging the latter. As will be noted in FIGURES 1 and 2 the upper faces of the discs 30 are somewhat concave or dished throughout their entire diameters, and, as shown in FIGURES 3 and 5, their outer peripheries are formed of flat annular bands 30a surrounding inner portions which are again concave. The shape of the discs employed depends both upon the soil and other conditions under which the harvester is to be used. It will be noted that when the machine is in operation the front portions of the discs extend down into the soil to pick up vegetables therein.

It will also be noted that cones 47 are mounted around the lower portions of the shafts 24 and rest upon the discs 30; that a portion of the periphery of one disc, irrespective of which of the above described shapes is employed, extends over a portion of the periphery of the other disc; and that a spring 48 is mounted around one of the shafts 24 to exert downward pressure on the cone 47 thereon and hold the discs thereon against the discs beneath. When the discs are provided with flat annular bands 30a around their outer peripheries the bands are normally retained in engagement with one another by the spring 48, but occasionally the discs can be adjusted so that they are laterally spaced from one another to position them opposite windrows which are relatively far apart. As previously stated the lateral spacing of the bearings 21 and 22 for the substantially vertical shafts 24 is adjusted by loosening and subsequently re-tightening the screws 26 and 27 after the shafts and their discs have been set the required distance apart.

While in the foregoing the preferred embodiments of the invention have been described and shown, it is understood that alterations and modifications may be made thereto, provided the said alterations and modifications fall within the scope of the appended claim.

What I claim is:

A pick-up for harvesters including a wheeled frame adapted to travel along the ground, an upwardly and rearwardly inclined conveyor mounted on the frame, downwardly and rearwardly inclined bearings arranged in aligned spaced apart pairs, said bearings being transversely spaced from one another and mounted on the frame for lateral adjustment relative to one another, a shaft rotatably mounted in each of said bearings, a disc mounted on the lower extremity of each shaft for rotation therewith, each disc being substantially concave and having an outwardly projecting peripheral band thereon extending in a plane normal to the axis of the disc, said discs being arranged in overlapping relation and projecting rearwardly over the front margin of said upwardly and rearwardly inclined conveyor, means for retaining the bands in proximity one to the other, means on the frame for rotating the shafts in opposite directions, resilient means on one of the shafts for urging the disc thereon in a direction toward the other disc, a shield mounted on the frame above each disc for adjustment relative to the spacing of the disc axis from the adjacent side of the conveyor, a scraper pivotally mounted on each shield adapted to scrapingly engage the upper wall of the corresponding disc, and spring means for yieldingly urging each scraper into scraping engagement with the disc beneath it.

References Cited in the file of this patent

UNITED STATES PATENTS

| | | |
|---|---|---|
| 709,720 | Palmer | Sept. 23, 1902 |
| 1,076,363 | Harrison | Oct. 21, 1913 |
| 2,510,242 | Minns et al. | June 6, 1950 |
| 2,606,416 | Bruner | Aug. 12, 1952 |